H. W. MATTONI.
SAFETY DEVICE FOR AEROPLANES.
APPLICATION FILED JUNE 22, 1910.
1,005,258.
Patented Oct. 10, 1911.
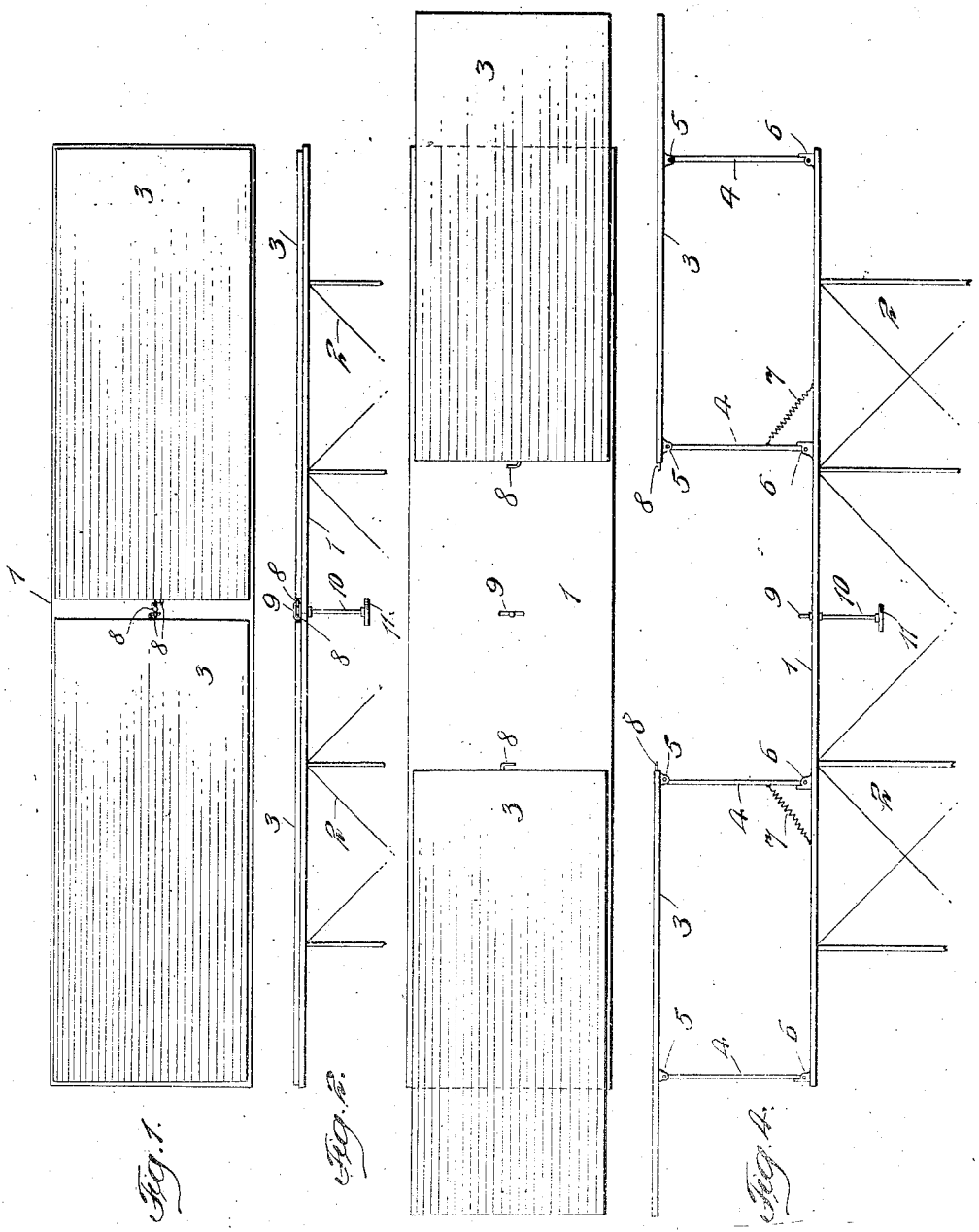

UNITED STATES PATENT OFFICE.

HENRY W. MATTONI, OF NEW YORK, N. Y.

SAFETY DEVICE FOR AEROPLANES.

1,005,258.  Specification of Letters Patent.  Patented Oct. 10, 1911.

Application filed June 22, 1910. Serial No. 568,380.

*To all whom it may concern:*

Be it known that I, HENRY W. MATTONI, a citizen of the United States, residing at New York, in the county of New York and State of New York, have invented certain new and useful Improvements in Safety Devices for Aeroplanes, of which the following is a specification, reference being had therein to the accompanying drawing.

My invention relates to means and mechanism for facilitating the landing of aeroplanes, and insuring against the falling of the plane in case the motive power fails, and has for its object the provision of a safety device very simple in construction, easy to operate, and which will insure safety in landing after a flight, avoiding any sudden concussion with the ground, enabling the operator to effect a landing with great accuracy in a small space.

To attain the desired end, my invention consists in certain novel and useful combinations or arrangements of parts, and peculiarities of construction and operation, all of which will be hereinafter first fully described, and then pointed out in the claim.

In the drawing, Figure 1 is a plan view of my safety device applied to the upper plane of an aeroplane, showing the parts in the position they occupy when not in use. Fig. 2 is a side elevation thereof. Fig. 3 is a plan view showing the safety mechanism as extended. Fig. 4 is a side elevation of the device extended, as in Fig. 3.

Similar numerals of reference, wherever they occur, indicate corresponding parts in all the figures.

1 is the plane of an aeroplane, either a monoplane or biplane, provided with the usual framework 2 for connecting the mechanism, etc., to be supported.

3 are supplemental, safety planes, connected to the plane 1 by means of rods 4 hinged at 5 and 6.

7 are springs which automatically throw the safety planes to an elevated position and extend the same, when desired.

8 are fingers carried by the supplemental planes, arranged to engage a rotatable arm 9 when said planes are folded down in an inoperative position. The arm 9 is carried by a vertical, rotatable shaft 10, provided with a manipulating wheel 11 which is located within easy reach of the operator.

I have shown all of the planes as substantially flat, but it is obvious they may have any preferred shape and configuration, be made of any appropriate material, and be used in any desired number, and in any position, without departing from the spirit of my invention.

Having now fully described my invention, what I claim as new therein, and desire to secure by Letters Patent, is:

In a device of the kind described, the combination with a plane, of supplemental planes pivotally mounted on the first mentioned plane, fingers carried by said supplemental plane, springs for moving said supplemental planes in an operated position, and a rotatable arm for engaging said fingers for holding said supplemental planes in an inoperative position.

In testimony whereof I hereto affix my signature in presence of two witnesses.

HENRY W. MATTONI.

Witnesses:
 THEO. K. LOEWENTHAL,
 ADOLPH FALCK.